United States Patent [19]

Marti

[11] Patent Number: 4,928,808

[45] Date of Patent: May 29, 1990

[54] MACHINE FOR UNSCRAMBLING AND POSITIONING CONTAINERS

[76] Inventor: Jaime S. Marti, Emancipacion No. 8, Barcelona, Spain

[21] Appl. No.: 286,067

[22] Filed: Dec. 19, 1988

[30] Foreign Application Priority Data

Dec. 18, 1987 [FR] France ............................ 87 18194

[51] Int. Cl.⁵ ............................................ B65G 17/32
[52] U.S. Cl. .................................. 198/397; 198/400; 198/455; 221/164; 221/167; 221/169; 221/171
[58] Field of Search ................. 198/397, 455, 400; 221/164, 167, 169, 171

[56] References Cited

U.S. PATENT DOCUMENTS

| 990,593 | 4/1911 | Ringland et al. | 221/235 |
|---|---|---|---|
| 1,823,995 | 9/1931 | Streby | 221/168 |
| 1,989,924 | 2/1935 | Hill | 221/285 |
| 2,033,090 | 3/1936 | Barker | 221/135 |
| 2,278,599 | 4/1942 | Veit | 209/544 |
| 2,343,496 | 3/1944 | Carroll | 221/233 X |
| 2,776,047 | 1/1957 | Howard | 198/856 |
| 2,901,088 | 8/1959 | Evasic | 198/397 |
| 2,904,162 | 9/1959 | Simer | 198/397 |
| 2,972,410 | 2/1961 | Schulte et al. | 209/644 |
| 3,012,651 | 12/1961 | Hawkes | 198/397 |
| 3,079,042 | 2/1963 | Sterling | 221/14 |
| 3,164,291 | 1/1965 | Sterling | 221/10 |
| 3,295,659 | 1/1967 | Aidlin | 221/169 X |
| 3,338,373 | 8/1967 | Aidlin et al. | 198/397 |
| 3,543,909 | 5/1968 | Ueda | 198/397 |
| 3,650,368 | 3/1972 | Nalbach | 198/397 |
| 3,656,604 | 4/1972 | Sterling | 198/392 |
| 3,662,872 | 5/1972 | Nalbach | 198/397 |
| 3,870,194 | 3/1975 | Taylor | 221/167 X |
| 4,130,194 | 12/1978 | Schindel et al. | 198/397 |
| 4,154,329 | 5/1979 | Hildenbrand | 198/392 |
| 4,388,989 | 6/1983 | Edmunds et al. | 198/339.1 |
| 4,681,209 | 7/1987 | Marti | 198/392 |
| 4,798,277 | 1/1989 | Dubuit et al. | 198/397 |

FOREIGN PATENT DOCUMENTS

| 459/10031 | 6/1966 | Fed. Rep. of Germany . | |
| 2042547 | 8/1970 | Fed. Rep. of Germany . | |
| 1558379 | 12/1979 | United Kingdom | 198/392 |

Primary Examiner—Robert J. Spar
Assistant Examiner—Cheryl L. Gastineau
Attorney, Agent, or Firm—Fleit, Jacobson, Cohn, Price, Holman & Stern

[57] ABSTRACT

An unscrambler for unscrambling and orientating containers such as plastic bottles includes a hopper (1), having straight or slightly curved walls, a plurality of travelling carriages (20) having holding elements (5) with openings (6) for receiving individual containers and passageways (22) for receiving and positioning the containers, the travelling carriages (20) moving along an enclosed path and being interconnected and drawn by a flexible or hinged drive belt (33), and adjustable shelf (8) disposed between holders (5) and passageways (22) for supporting the containers (2) until they reach a discharge station where they drop through an opening in the shelf.

31 Claims, 9 Drawing Sheets

MACHINE FOR UNSCRAMBLING AND POSITIONING CONTAINERS

BACKGROUND OF THE INVENTION

1. Field of the Invention

This invention relates to a machine intended for unscrambling and automatically positioning containers which may be of very different forms and sizes, with the ability to change its rate of production by units of time within very wide margins.

2. Description of the Prior Art

Machines for unscrambling and positioning containers, such as bottles, are known from U.S. Pat. No. 3,295,659 and U.S. Pat. No. 3,650,368, for example. The first Patent describes a machine in which a rotatable disc inclined with respect to the horizontal forms the bottom of a receptacle into which the containers or bottles which are to be sorted are loaded at random, and has at its periphery a plurality of openings adapted to receive and retain the containers or bottles for transporting them from a receiving zone to an unloading zone where they drop through a chute to be oriented or positioned, falling by gravity through a guideway, or chute, device to be transported away by an associated device. The inclined configuration of the bottom of the receptacle is for the purpose of guiding the retainers to the lower part where they are picked up by the conveyor and rotated to the upper part where the unloading zone is disposed. The second patent referred to above describes a similar unscrambling and positioning machine for such containers in which a plurality of chutes are mounted on a revolving drum below the bottom of the receptacle or hopper, and adapted so that the chutes receive individual containers at the unloading zone and position or orient them and transport them to another position where they are picked up by a conveyor for conveying them away from the machine. In addition, Australian Patent No. 499,038 corresponding to British Patent Specification No. 1558379 shows a similar machine in which a plurality of chutes mounted on a revolving drum below the bottom of the hopper sequentially transport individual containers to an unloading zone from where they are dropped through chutes in an upright position and subsequently diverted toward an adjacent conveyor for transporting them away from the machine.

All of these machines utilize a hopper or upper receptacle for receiving the bottles or containers having a circular or cylindrical configuration inside of which a rotating element, such as a disc or annular structure, collects them by means of pockets located at the periphery thereof in a loading area at the bottom of the inclined planar bottom and carries them along the periphery of an inclined plane to the unloading zone where they drop through an opening by gravity toward the chutes which orient or position them in an upright position. Such unscramblers however present the following drawbacks: attempts to increase the performance by enlarging the diameter of the machine, requires modification of the conveying means to adapt it to the enlarged configuration, which would be extremely costly and require shut down of the machine for substantial periods of time; an attempt to increase the spead of the machine to improve the performance thereof, introduces a centrifugal force that makes it difficult to unload the containers at the unloading zone so that they can drop by gravity into and through the positioning chutes, which can also damage the containers.

The increasing use of plastic containers in the bottling industry in general and the beverage industry in particular has caused a constant increase in problems of automatic feeding of these plastic bottles into the filler. Longstanding classical problems of traditional prior art unscramblers include the need for constant attention of personnel at the unscramblers in columns in order to undo obstructions, and continuous maladjustments and wear in belt positioners. The inventor's previous unscramblers, such as that shown in U.S. Pat. No. 4,681,209, were capable of outputs of up to 13,000 bottles per hour with 1.5 liter bottles with rotary unscramblers. For higher outputs (generally 25,000 bottles per hour) a number of unscramblers were grouped together by way of various connecting systems, which somewhat alleviated the problem depending on the stability of the bottle and the available space in the plant. However, the tendency today among beverage bottlers is to increase bottling velocities above 30,000 bottles per hour in order to reach 35,000 units per hour with the aim of decreasing labor costs per unit bottled. Accordingly the problems of unscrambling the empty bottles and feeding them into the filler increased, and until now, it is the applicant's belief that attempts to resolve this problem were resolved by utilizing more than one unscrambler which many times created problems of space, high purchase cost, and increased maintenance and personnel costs. An associated problem was that once the empty bottles were standing, they were accelerated, increasing their speed several times, i.e., 2 to 4 times depending upon the number of unscrambler machines used. This resulted in fallen bottles and interruptions in the bottling line.

It is also known from the inventor's previous U.S. Pat. No. 4,681,209 to provide a machine of the type referred to above wherein the chutes for receiving and guiding the containers dropped through the unloading zone are removable and exchangeable with chutes of different sizes to accommodate containers of many different sizes. The recesses for receiving the containers at the lower part of the machine are also formed by detachable parts which are interchangeable with replacement parts to accommodate the different shapes and sizes of the containers being handled.

This latter machine is designed for continuous feeding of other machines, such as high production filing machines, and is able to carry out this function owing to the large number of containers which it can position correctly per unit of time. Containers are fed by means of a horizontal transport belt toward the utilization line. Another factor in its high production rate is a minimum of interruptions occurring in its work cycle owing to its design and the means of control which are provided, while it is also possible for special purposes to operate two or more of these machines in parallel with the two production lines in this case joining to form a single line which is used to feed the corresponding filling machine.

It is understandable that in a machine having these characteristics the main parameter is reliable operation of which total production directly depends, because of which this automatic cycle machine is equipped with control and/or safety components designed to immediately detect any irregularity in the state of the containers (imperfect finish, irregular shape, etc.), or in their positioning, in the means of container transfer within the machine, in which case where defective they must immediately be rejected and removed from the other containers in such a way that they do not at any time interrupt the functioning of the machine as described hereafter.

BRIEF SUMMARY OF THE INVENTION

In order to solve the above problems, this invention was conceived wherein the unscrambler is in the form of a linear machine capable of handling 500 to 600 bottles per minute depending on shape and size) in a single unit, and therefore with a single exit conveyor It is an object of this invention to improve upon prior container or bottle unscrambling and positioning machines of the type referred to above by overcoming the above-mentioned disadvantages.

It is a further object of this invention to provide a machine for unscrambling, sorting, and positioning containers, such as bottles, of many shapes and sizes which is capable of operating at high speed and handling a high number and volume of containers and continuously supplying them to a bottle filling line or similar associated equipment.

The above objectives are achieved by the instant invention which comprises a hopper or receptacle for receiving randomly a plurality of containers or bottles to be sorted, the hopper having an elongated or eliptical configuration and a bottom having a peripheral edge portion at a predetermined distance from the side wall of the hopper to provide a space through which the containers drop. The hopper and particularly the bottom member may be inclined so that the containers loaded therein move by gravity toward the lower section. An endless conveyor may be positioned above the bottom of the hopper and may be a flat belt type or have pockets therein for receiving individual containers and transporting them to a position adjacent the space between the side wall of the hopper and the outer peripheral edge portion of the bottom member. A chain or belt driven conveyor continously moves around the periphery of the hopper below the bottom thereof and has receptacles mounted thereon for receiving the containers and transporting them around the hopper to a belt. With this invention, the bottle accelerates until it reaches its top speed in the machine, i.e. (while it is lying flat and not standing up in the exit conveyor belt, as was the previous usual practice) position where they drop out of the receptacles and through an opening in a shelf which supports them during their travel around the hopper into chutes which are attached to the conveyor below the receptacles and are constructed to position the containers generally upright and deposit them onto a platform, or conveyor device, for moving them to an associated operation, such as filling, for example. The conveyor devices are preferably in the form of a plurality of carriages supported on sliding and/or rolling devices, such as rollers, operating in supporting and guiding grooves mounted below the hopper to travel generally under the periphery of the hopper bottom in a continuous manner. The support and guiding means for the carriages may be spaced guideways mounted on the frame of the machine and the drive means for the carriages may be chain and sprocket drive means, or pulley and cable type devices mounted under the ends of the hopper and driven by an electric motor, for example. The hopper and bottom thereof may be tilted in the machine so that the containers are fed by gravity to the space between the peripheral portion of the bottom and the side wall of the hopper for feeding into the receptacles at the lower part of the hopper. A guideway device may be provided in the hopper to preorient and guide the containers moving by gravity in the horizontal or lying position to prevent jamming of the containers and to provide for continuous uninterupted operation of the machine. Instead of being inclined, the hopper may instead have an inclined bottom, or member, only, or a vibrator type device which feeds the containers to the receptacles. An independent conveyor may also be utilized, either alone or in combination with an inclined bottom for assisting in the feeding of containers to the receptacles in the horizontal or laid down position.

The entire machine is preferably mounted on a frame supported on adjustable legs for levelling and have an adjustment device for maintaining proper tension in the belt or chain drive system.

The receptacles are interchangeable in size and are removably mounted on the carriages and the chutes are also of varying sizes and removeably mounted on the carriages underneath the receptacles.

Other features of the invention and the important advantages thereof will become apparent from the detailed description below.

BRIEF DESCRIPTION OF THE DRAWINGS

The invention will now be described in detail with reference to the accompanying drawings wherein.

DETAILED DESCRIPTION

Figure 1:
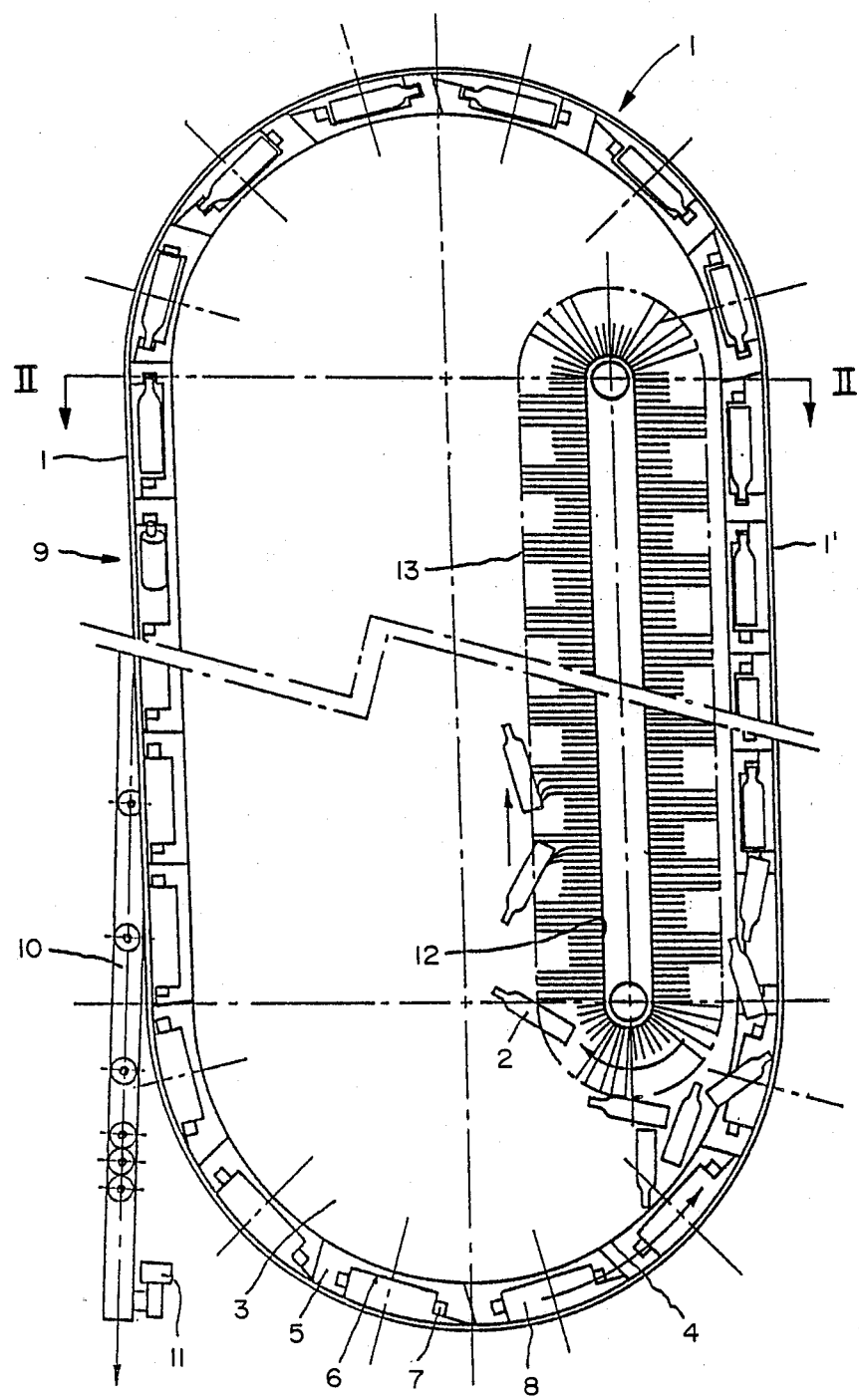
FIG. 1 is a schematic top plan view of the bottle unscrambling and positioning machine of this invention.
Figure 9:
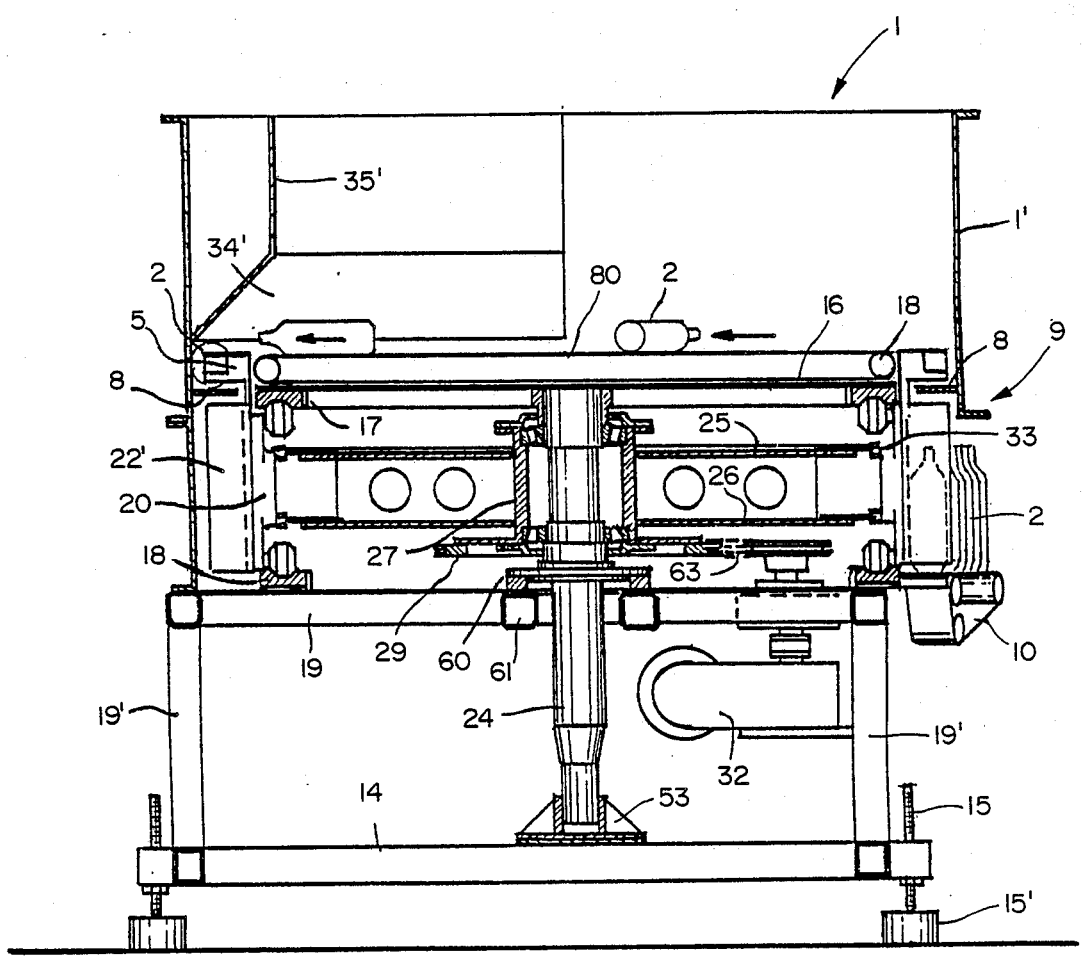
FIG. 9 is a partly schematic cross-sectional view similar to FIG. 2 showing a different embodiment of the invention.

With reference to FIG. 1, the unscrambler of this invention includes a stationery receptacle or hopper generally shown at 1 open at the top having two substantially parallel elongated sides and curved or circular end portions, containers or bottles 2 being loaded into the hopper through the open top. The hopper has a bottom 3 having a peripheral edge 4 which is spaced from the side wall 1' of the hopper a predetermined distance to provide a peripheral space through which the containers 2 can fall. The hopper may be inclined as shown in the preferred embodiment of FIG. 2, and/or the bottom 3 only can be inclined, or the entire machine can be oriented horizontally as shown in FIG. 9 in which case a vibrator or additional conveyor means may be used to feed the containers to the peripheral edge which will be understood from the further description which follows. The hopper is mounted on a frame comprised of a lower base member 14 which may be planar, or in the form of a framework, having inclined members or framework 19 connected thereto at one end and supported at the other end by upstanding legs or framework 19'. The support frame is mounted by adjustable legs 15 on the floor or on mounting blocks 15'. The hopper may be made generally of any suitable material such as sheet metal having peripheral flanges 50, 51 and 52 for reinforcement and for attachment to the frame by suitable means such as bolts and nuts or screw fasteners (not shown). The hopper may be made in separate sections which are welded or removably fastened together at flange portions 51 by screw fasteners (not shown) for example.

Below, and/or in the lower portion of the hopper is mounted a supporting and guiding means for travelling carriages 20 and comprises a planar member 16 mounted at the upper end of a shaft 24 supported at its lower end in support member 53 mounted on the lower part 14 of the frame, for example. The lower end of shaft 24 may be cylindrical and removably fitted in telescopic fashion into a the tubular support member 54 on support 53. Shaft 24 is preferably further supported by bracing member 60 having portions thereof mounted on frame member 19, as shown at 61, in any suitable manner. Element 16 is shown as a planar element, but this may also be a framework, if desired which extends under the bottom of the hopper, i.e. below the bottom 3, for most of the length thereof and has mounted on the lower side of the peripheral portion thereof a grooved track 17. Directly below track 17 is an additional grooved track 18 which is mounted on framework 19 in spaced relation to grooved track 17. These grooved track members provides supporting and guiding elements for the carriages which form the conveyor and positioning means for the containers which will now be described.

Figure 2:
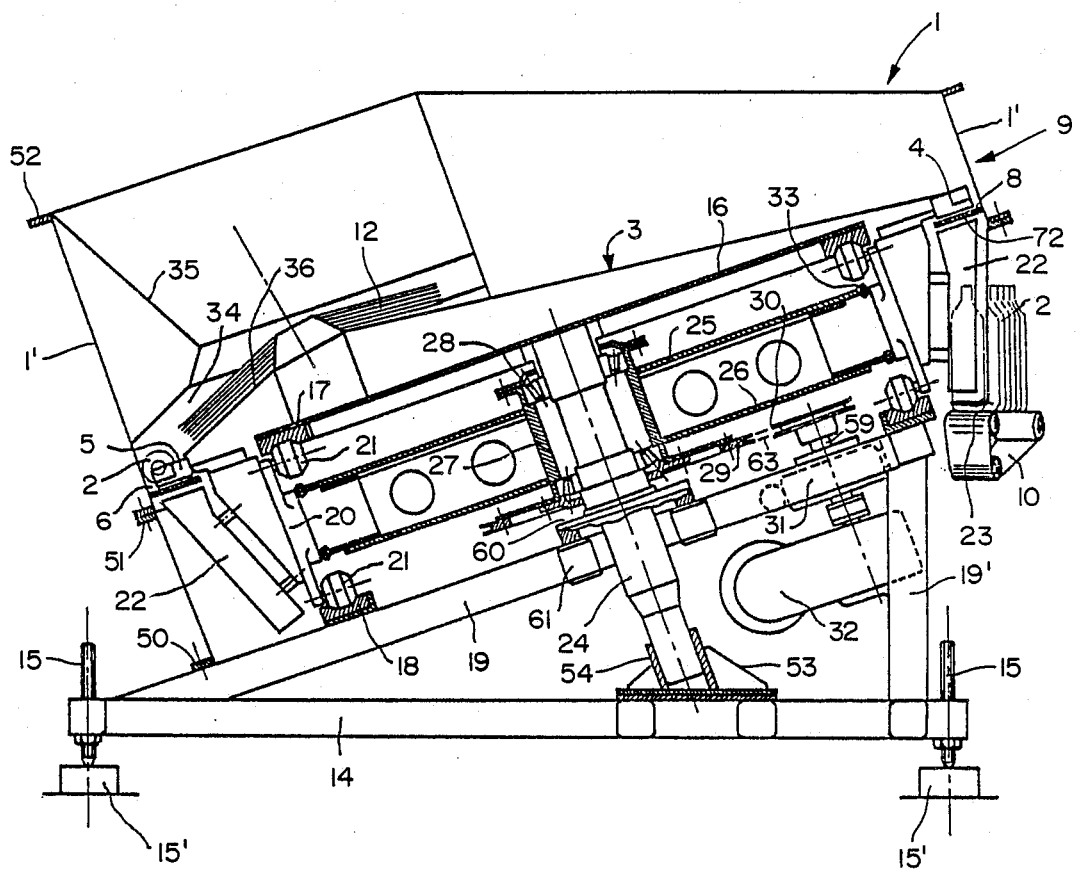
FIG. 2 is a partly schematic cross-sectional view taken along line II—II of FIG. 1.
Figure 3:
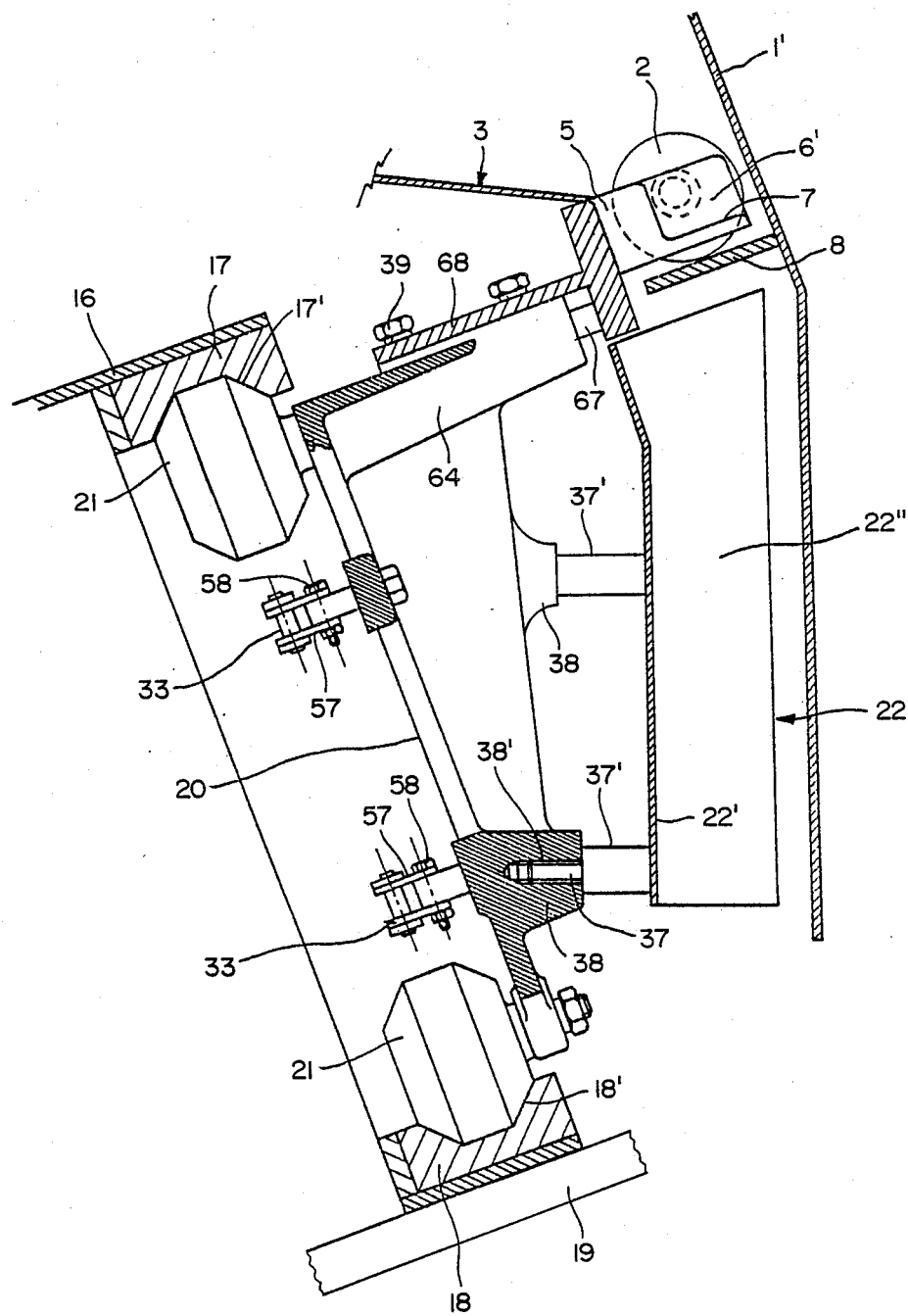
FIG. 3 is an enlarged cross-sectional view, taken along line III—III of FIG. 4, of part of the machine as shown at the right of FIG. 2 to show details of the carriage and removable receptacle and chute mounted thereon.
Figure 4:
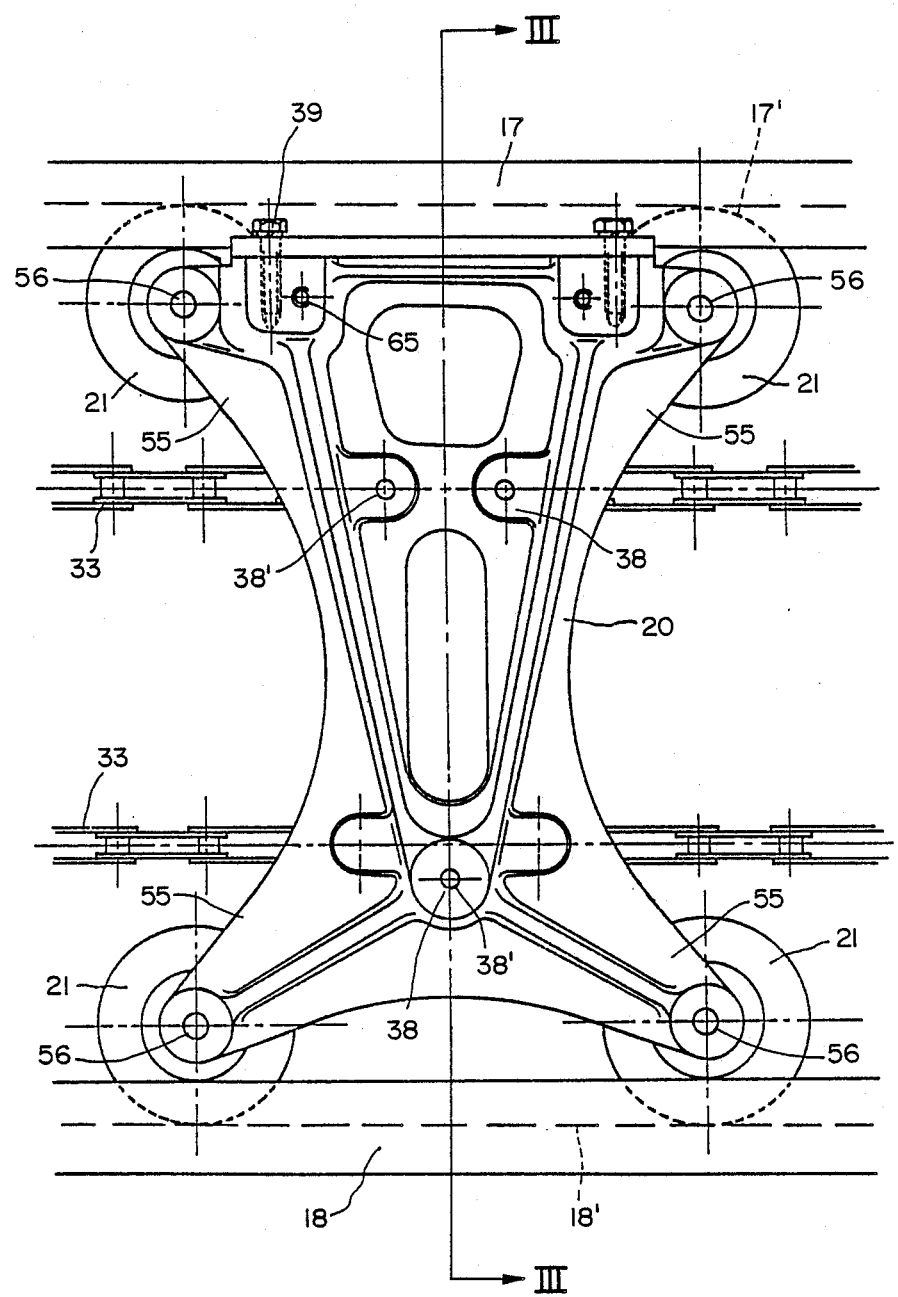
FIG. 4 is a front elevational view of one of the carriages of this invention.
Figure 6:
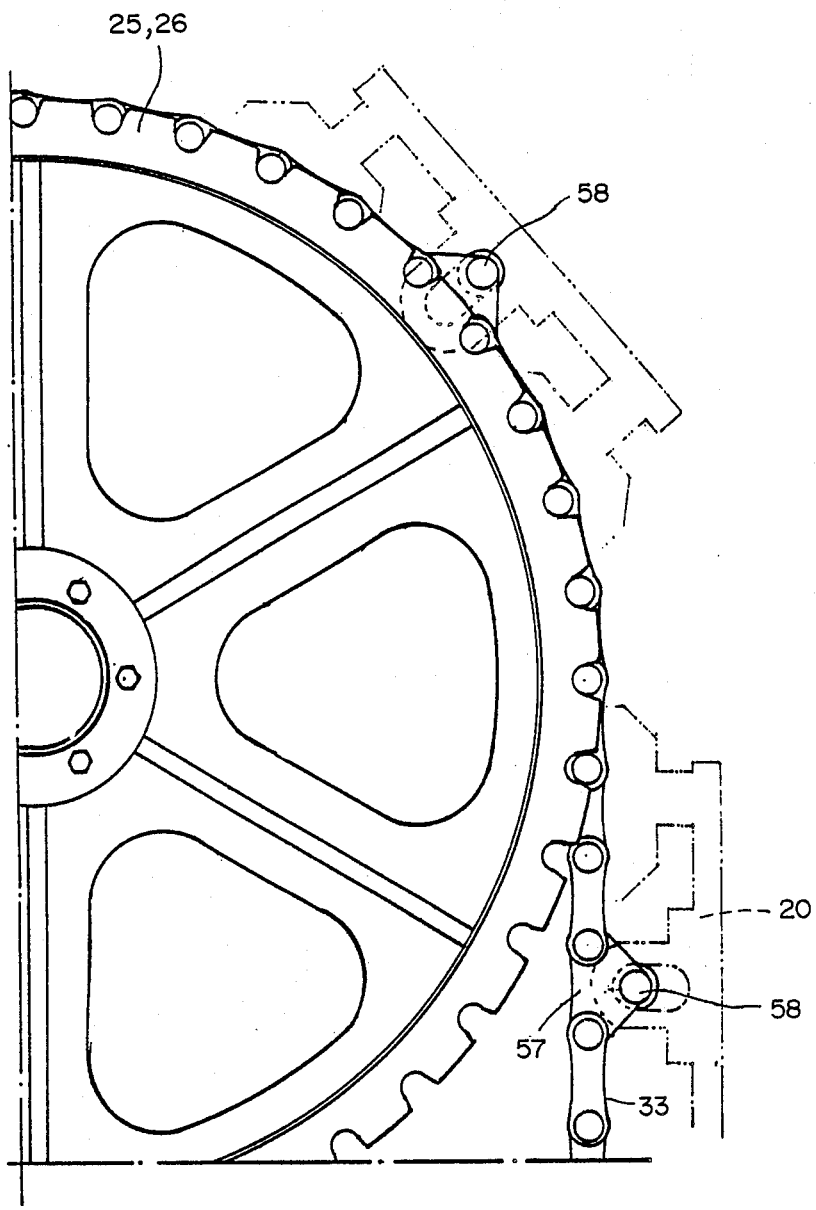
FIG. 6 is an enlarged partial top plan view of the chain and sprocket device for driving the carriages.

With reference to FIGS. 3 and 4, each carriage element may be in the form of a carriage body having arm like extensions 55 at the corners thereof on which rollers 21 are rotatably mounted on axles 56 mounted in arms 55. Rollers 21 engage with the grooves 17' and 18' in grooved track members 17 and 18 respectively, in rolling contact therewith so that carriage members 20 are supported and guided for travel adjacent to the periphery of the hopper. The carriage members 20 are connected to flexible belts or chains such as shown at 33, for example, by any suitable means such as belt clamps or bolt and nut fasteners 58 connected to links 57 of the chains in a suitable manner such as shown in FIGS. 3 and 6 wherein links 57 are pivotally connected to the carriages by bolt and nut devices 58. The chains 33 engage toothed wheels, or sprockets, 25 and 26 at each end of the machine which are supported in spaced relationship on hub 27 (FIG. 2) rotatably mounted by means of bearings 28 on shaft 24, at each end area of the machine.

Also mounted at the lower end of hub 27 is a pulley 29 engaged by a belt 6S which further engages pulley 30 on output shaft 59 of a reducing gear box 31 driven by motor 32 in a conventional manner, so that operation of drive motor 32 through the gear box and pulley and belt drive system rotates hub 27 which rotates sprocket wheels 25 and 26 thereby driving the chains and carriages connected thereto around the periphery of the hopper while guided and supported in the grooved tracks 17 and 18. The motor and gear box may be mounted and supported on the supporting frame members in any suitable manner. Details of the sprocket and chain drive system are more clearly shown in FIG. 6.

Figure 8:
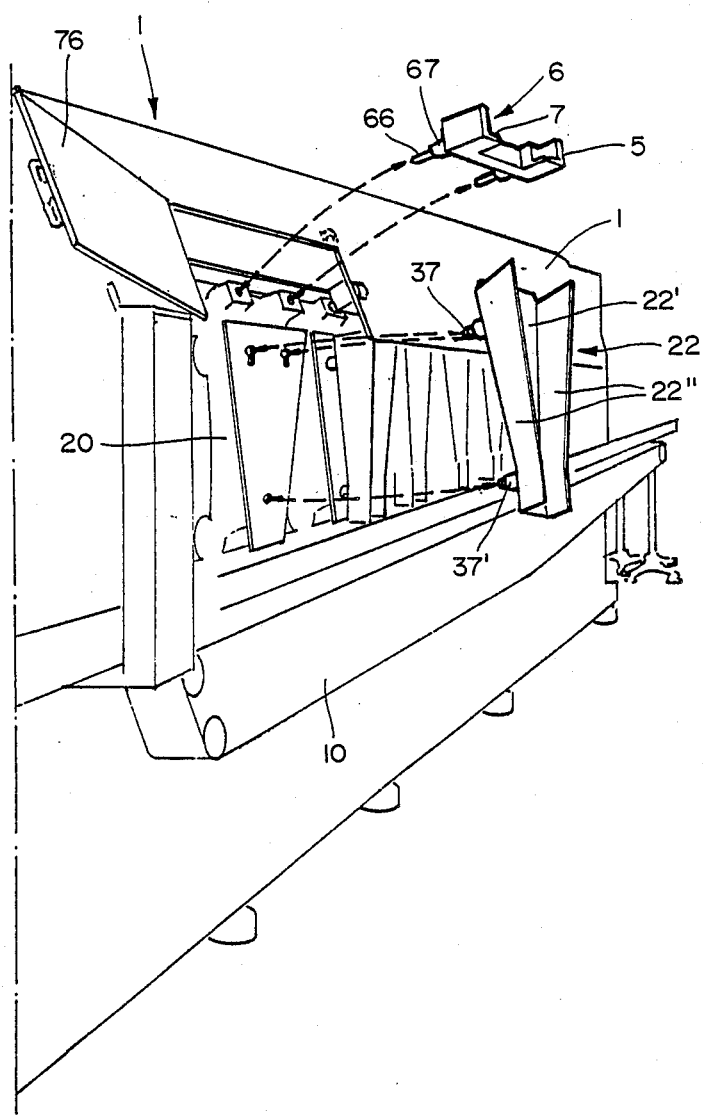
FIG. 8 is an enlarged partly schematic and exploded perspective view of part of a side of the machine of FIG. 1 showing the configuration and removability of the receptacles and chutes from the carriages.

FIG. 3 is a broken out cross section of the machine of the invention showing certain features of the carriage in greater detail. Each carriage 20 has bosses 38, preferably 3, (see FIG. 4) in which are provided receiving holes 38' for receiving projections 37 extending from bosses 37' on chute numbers 22. The engagement between projections 37 and holes 38' are preferably of the snap fit type such as shown in the replaceable container holding and similar chute elements in applicant's prior patent 4,681,209, to facilitate easy connection and removal of the chutes 22 to the carriages, as shown in FIG. 8, to accommodate different sizes of containers. These connections can also be of the bayonet slot type as shown in FIG. 8, for example, and further details thereof are not deemed necessary since the construction thereof would be well known to one skilled in this art, provided only that the connections, although removable, are sufficiently secure so that they will not become detached during use of the machine. At the upper part of each carriage 20 are projections 64 having receiving holes 65 therein (see FIG. 4) for receiving similar projecting members 66 extending from bosses 67 on holders 5 which receive the containers from the hopper. Holders 5 may also have an additional flange or web 68 extending therefrom with suitable bolt holes therethrough for receiving bolts 39 which engage in screw threaded bores in the top of elements 64. As an alternative, the holders 5 may be supported solely by projecting members 66, as shown in FIG. 8 or solely by extension 64 and flange element 68 using fasteners 39.

Each holding member preferably is in the form of a rectangular element having an open hollowed out or U-shaped construction providing a recess 6 for receiving the containers or bottles from the hopper and has cut out areas forming end walls 6' at the inside ends and ledges 7 between which an opening is provided through which the containers or bottles drop. The ledges are adapted to support by engagement with an end part, such as a neck of a bottle in any position in which the bottle is lying flat in the opening 6.

Figure 5:
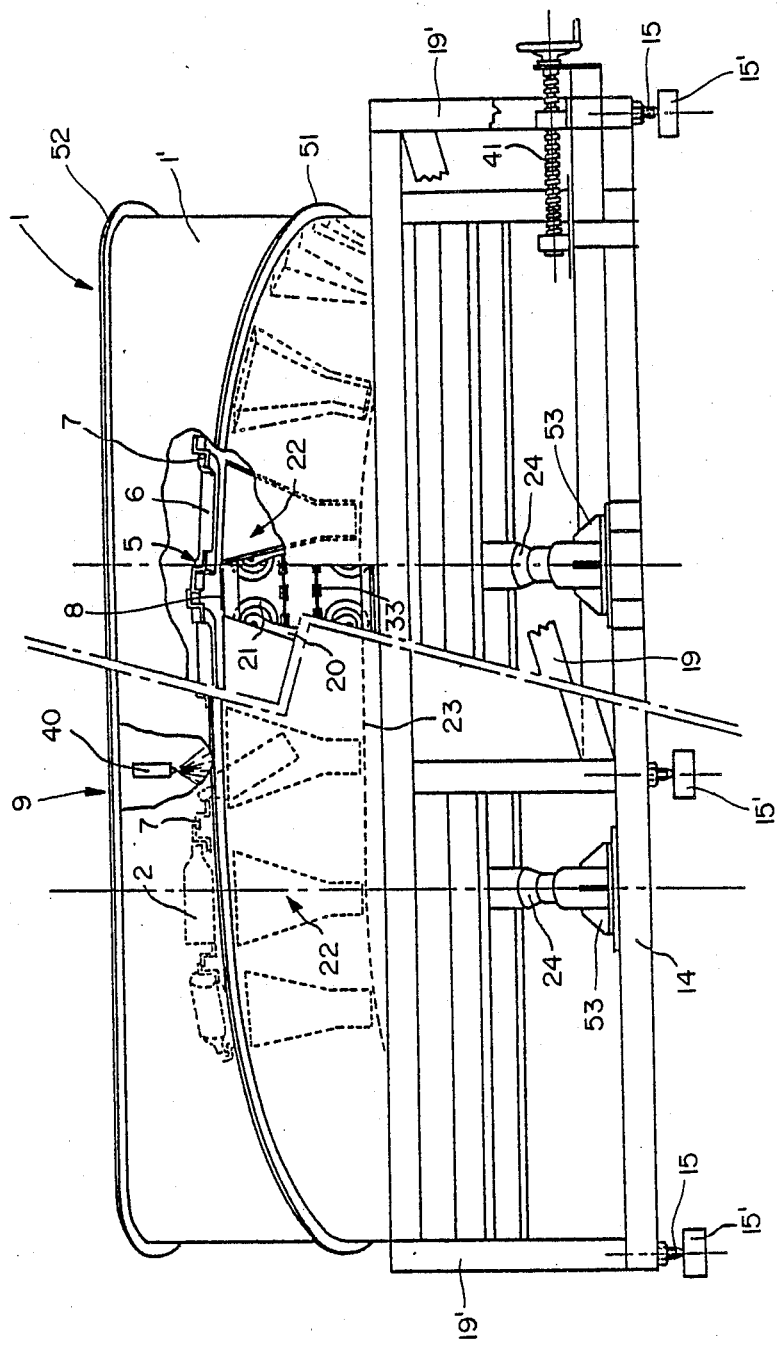
FIG. 5 is an end elevational view of the machine of FIG. 1 with parts cut away to show specific features and operation thereof.
Figure 7:
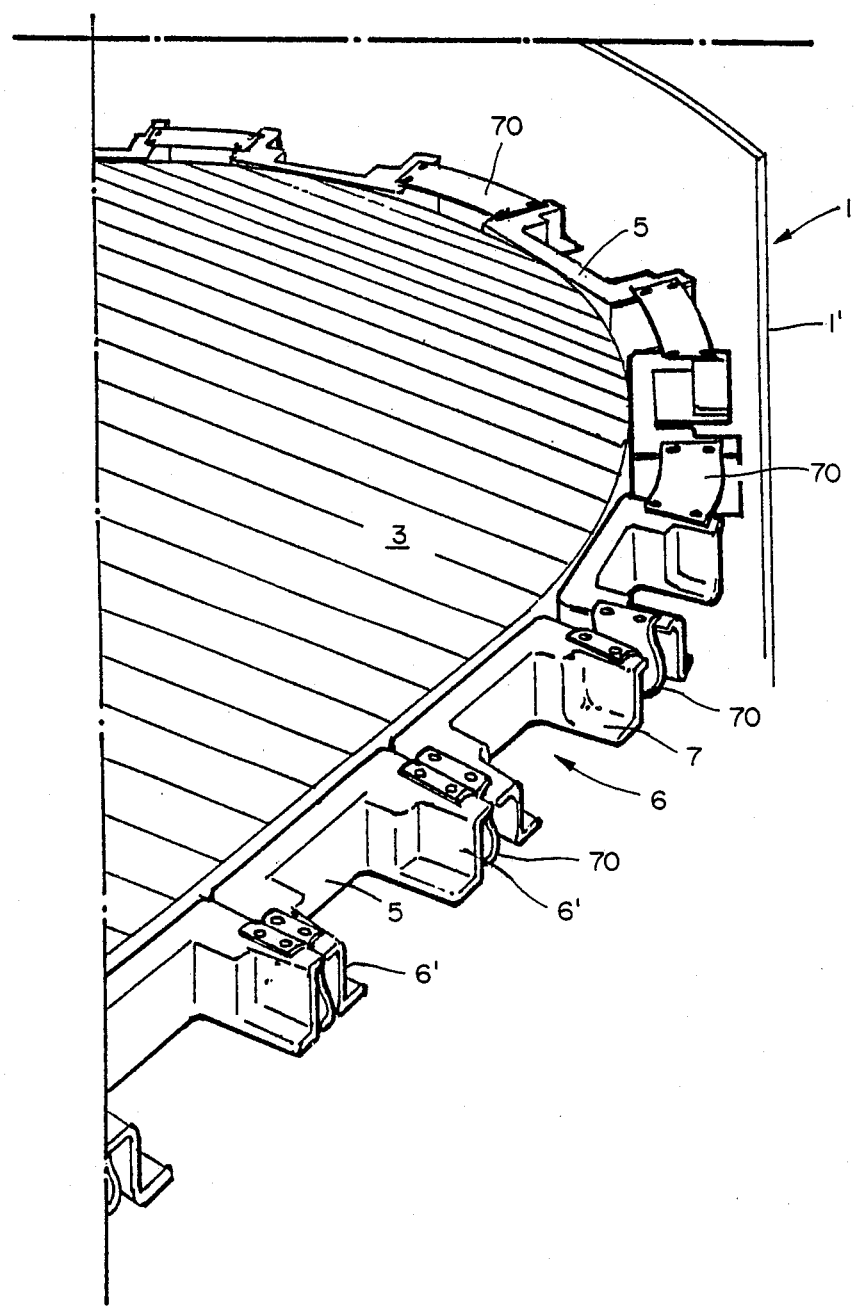
FIG. 7 is an enlarged partial perspective view of the receptacles showing the manner in which they move around the periphery of the bottom of the hopper.

A shelf or ledge 8 connected to the inside of side wall 1' (see FIG. 3) extends inwardly into the space between the holder members 5 and chutes 22 around the periphery of the hopper for supporting the containers or bottles 2 as they are conveyed around the periphery of the machine by the carriages and drive means therefore as previously described. Thus, the holders 5 receive the containers in recess 6 through which they drop until they contact the top surface of ledge or shelf 8 along which they slide until they reach the discharge station. FIG. 7 shows a clear illustration of the form of the holders 5 and the ledges 7 thereof and the manner in which the elements 5 continuously move around the periphery of the hopper as a continuous conveyor means. However, FIG. 7 does not show the shelf 8 which actually supports the containers in their travel in holders 5. FIG. 5 also shows the structural relationships between the holders 5, shelf 8, carriages 20 and chain drive elements 33. FIG. 7 also shows the use of flexible ribbon or sheet type connections 70 between the ends of adjacent holders 5 to prevent containers, bottles, or other articles from falling between the ends of the adjacent holders. These strip elements 70 may be of any suitable material such as plastic, fiberglass, nylon or the equivalent. Holders 5 and 22 are also made of a suitable material such as steel, aluminum, heavy duty plastic, or similar materials which are sufficiently durable to operate for long periods of time, or indefinitely. Carriages 20 are preferably also made of similar materials having long or indefinite life.

At a suitable position along the periphery of the hopper in the area of the path traversed by the holders 5 and chutes 22 a discharge opening is provided in shelf 8, such as at 9 (FIG. 1), which is of a size to permit the particular container or bottle in each holder 5 to drop through into chutes 22 which in the embodiment shown orient the bottle into the upright position, i.e. with the open neck end upwardly as they fall through the chute 22. Such an opening is shown in FIG. 2 at 72 and the operation can readily be seen from FIGS. 2 and 5 whereby the containers or bottles 2 are oriented uprightly by chutes 22.

In the preferred embodiment an exit conveyor 10 or a part thereof is positioned directly under at least one of the chutes 22 and operates continuously in cooperation or sychronization with the speed of the carriages 20 so that the containers or bottles are transferred from chutes 22 with minimum or no differential speed which prevents inadvertent falling over of the upright containers. As will be seen in FIGS. 2, 3, 5 and 8, chutes 22 have a back side 22' and two spaced opposing sides 22" which are slanted or angled with respect to each other to provide a gradually converging channel or passageway therebetween through which the containers or bottles pass and which controls orienting of the containers or bottles into the desired position. The side opposite the back side 22' is open so that the passageway is formed on the outer side of chutes 22 by the inner surface of the sidewall 1' of the hopper. However, at the discharge station 9, the inner surface of sidewall 1' is discontinuous, so that the bottles or containers can pass out of the open side of each chute 22 as they are urged along by chute 22 and supported at their bottoms by the top surface of conveyor 10. Conveyor 10 can be oriented in its direction of travel at any angle suitable for synchronization or cooperation with the operation of the carriages 20 in a preferred embodiment. For maximum speed and smoothness of the transfer operation, this angle may be tangential or close to tangential, as shown in FIG. 1.

Also as shown in FIG. 8, a door 76 may be provided in the sidewall 1' of the hopper for access to a position predetermined to be more suitable for changing holders 5 and chutes 22 for replacement or repair, or when desired to facilitate use with different size containers, similarly to the access door shown in FIG. 12 of applicant's prior U.S. Pat. No. 4,681,209.

In an alternative embodiment of the invention, a belt conveyor 12 may be provided within the hopper above the bottom 3 to aid in collecting and guiding the containers or bottles to the receiving area in which they are deposited from the hopper into holders 5. This conveyor 12 may be a plane conveyor belt or may have appendages 13 thereon for facilitating free orientation of the containers into a desired position for depositing into holders 5. Such a conveyor 12 may be positioned at one side of the centerline of the machine, adjacent the depositing area, as shown in FIG. 1, but this conveyor can be suitable positioned otherwise, if desired. FIG. 2 shows such a conveyor 12 in combination with an inclined hopper having inclined bottom 3 where it is positioned in the lower section of the hopper.

Also in the embodiment particularly as shown in FIG. 2, a guideway structure is provided comprised of inclined bottom surface portion 36 and thereabove a profile element 35 connected to sidewall 1' adapted to cooperate with bottom portion 36 to provide a guideway or passageway channel 34. The shape, or profile, of element 35 is such as to in cooperation with bottom portion 36 preposition the containers or bottles from a random position in which they are fed into the hopper to a lying position wherein the longitudinal axis is substantially horizontal as they pass through channel 34 for proper alignment with the longitudinal axis of the holders 5 for easy reception of the containers therein, thus avoiding misfitting of the containers into the holders 5, or jamming of the containers in the inlet area to the holders 5. Such a guideway or passage means could be formed by a sheet like element suitably mounted along the sidewall 1' or a part thereof in the area in which the containers are deposited in holders 5.

In the operation of this machine, the bottles or containers are dumped or loaded into the upper open end of the hopper 1. If the hopper is inclined as shown in FIGS. 2 and 5, they fall by gravity toward the lower side into the guideway portion and pass through channel 34 in the lying or horizontal position, and drop into the openings in holders 5. Since the carriages 20 are continuously moving, the containers are continuously picked up by holders 5 and conveyed along the top surface of shelf 8 around the peripheral region of the machine until they reach unloading or discharge station 9 where, due to the gap in shelf 8 providing opening 72, they pass through opening 72 and into chutes 22 which orients them into a predetermined position, shown as upstanding in this embodiment. The particular size of opening 6 and provision of ledges or end support elements 7 in holders 5 assures that containers having a bottle shape with a neck at one end always drop bottom first through chute 22. Of course the holders 5 and parts thereof can be designed and sized to accommodate any shape of container and to drop them in any position. From chutes 22 they are deposited onto continuously moving conveyor 10 and carried off to a further operation. At the discharge station, an air pressure device including a nozzle 40 may be positioned for ejecting a blast of pressurized air onto the containers for urging them to fall through the opening 6 and into the chutes 22 as shown schematically in FIG. 5. As previously stated, the hopper and drive mechanism need not be inclined as shown in FIG. 2, but could be substantially horizontal and only the bottom 3 need be inclined or as an additional alternative, a feeding and/or vibrating device may be disposed in hopper having an inclined bottom similar to that shown at 3 and 36 so that the containers are still fed by gravity into the holders 5, and a conveyor such as that shown at 12 can be used to assist in the feeding of the containers to the holders.

In a further embodiment of the invention wherein the machine is oriented substantially horizontally, as shown in FIG. 9, the bottom of the hopper 1 may be comprised of 1 or a plurality of belt type conveyors 80 supported and driven by rollers 81, for example which operate to feed containers 2 toward the prepositioning guideway passage 34' from where they are deposited into the holders 5 which are of course continuously moving as in the embodiment previously described. The holders then convey the containers around the machine to the unloading area 9 where they are dropped through chutes 22 and deposited onto a conveyor 10 as previously described. The conveyor arrangement forming the bottom, or part of the bottom of the hopper can be a plurality of spaced belt conveyors 80 having stationary planar bottom surfaces therebetween, for example, or may be a plurality of closely spaced adjacent belt conveyors 80 for continuously feeding the containers to the loading zone or pick up area.

Significant novel features of this invention include the construction of the carriages which each have removably attached thereto a holder 25 and an associated chute 22, the carriage having a plurality of wheels running in guideway passages around the periphery of the machine continuously. In the inclined elongated embodiment of the invention, unique features allow the lower straight zone of the machine to be used for loading into the continuously moving holders 5 and the upper straight zone to be used for discharging of the containers.

A compressed air jet may be used to eject containers that have been misaligned from the holders in the manner also previously described in applicant's prior U.S. Pat. No. 4,618,209. The motor drive unit may be controlled by a programmable digital regulator, that not only allows manual speed regulation, but automatic regulation as well. In a practical embodiment of the invention, the machine may generally have a length of about 11 meters, a width of about 2 to 3 meters, and a height of about 2 meters. However, despite its size, this unit can be easily transported, even in assembled condition and be very quickly set up for operation. The exit conveyor 10 may utilize a vacuum conveyor belt which more firmly holds the containers deposited thereon in a desired position.

A tensioning device such as shown at 41 (FIG. 5) can also be provided on the framework and adapted to control the tension in the drive chain 33, or belt drive system if the latter is used.

I claim:

1. An automatic unscrambler for orientating containers such as plastic bottles and lightweight articles comprising:
   a hopper for receiving a plurality of randomly positioned containers;
   a side wall on said hopper;
   a bottom on said hopper having a peripheral portion spaced from said side wall to provide a space through which the containers can pass;
   a plurality of carriages supported below said hopper for movement in a path adjacent said peripheral portion of said bottom;
   at least one flexible drive means connected to each carriage for interconnecting said carriages and driving said carriages in said path;
   container holders mounted on said carriages for movement therewith and in position for receiving containers from said peripheral portion of said bottom of said hopper;
   openings in said container holders for allowing the containers to pass therethrough;
   means on each holder engaging one part of each container in a respective holder for tilting the container into a predetermined position as the container passes through the respective opening;
   container support means extending below said holders for supporting the containers in said holders during movement of the holders;
   a discharge section in said support means for discontinuing support of the containers at a predetermined location so that containers in said holders pass through said container holder openings at said discharge section; and
   passageway means mounted on said carriages below said container holder openings for receiving and orientating containers passing through said openings into a predetermined position.

2. An automatic unscrambler as claimed in claim 1 and further comprising:
   container directing means for directing containers in said hopper toward said container holders.

3. An automatic unscrambler as claimed in claim 2 wherein:
   said hopper bottom comprises an at least partly planar member; and
   said container directing means comprises said at least partly planar member being inclined.

4. An automatic unscrambler as claimed in claim 2 wherein:
   said container directing means comprises a conveyor means in said hopper for feeding the containers to said container holders.

5. An automatic unscrambler as claimed in claim 1 and further comprising:
   support means below said hopper for supporting and guiding said plurality of carriages in said path.

6. An automatic unscrambler as claimed in claim 5 wherein:
   said support means comprises channel means; and
   channel engaging means are provided on said carriages for engagement in said channel means.

7. An automatic unscrambler as claimed in claim 6 wherein:
   said channel means comprises channel members mounted in spaced relationship and having grooves therein facing each other; and
   said channel engaging means comprises a plurality of rollers rotatably mounted on each carriage and in rolling contact in said grooves.

8. An automatic unscrambler as claimed in claim 7 wherein said at least one flexible drive means comprises:
   at least one flexible drive element; and
   drive motor means operatively connected to said at least one flexible drive element for driving said flexible drive element.

9. An automatic unscrambler as claimed in claim 8 wherein:
   said at least one flexible drive element comprises a chain.

10. An automatic unscrambler as claimed in claim 9 and further comprising:
    sprocket means operatively connected to said chain; and wherein
    said drive motor means is operatively connected to said sprocket means for driving said sprocket means.

11. An automatic unscrambler as claimed in claim 1 wherein said at least one flexible drive means further comprises:
    drive motor means operatively connected to said at least one flexible drive means for driving said at least one flexible drive means.

12. An automatic unscrambler as claimed in claim 11 wherein:
said at least one flexible drive means comprises a chain.

13. An automatic unscrambler as claimed in claim 12 and further comprising:
sprocket means operatively connected to said chain; and wherein
said drive motor means is operatively connected to said sprocket means for driving said sprocket means.

14. An automatic unscrambler as claimed in claim 1 and further comprising:
means associated with said hopper for preorientating said containers into a lying position so that said container holders receive the containers only in said lying position.

15. An automatic unscrambler as claimed in claim 1 wherein:
said carriages are provided with pivotal connecting elements for pivotally connecting adjacent carriages together; and
said drive means is operatively engageable with said carriages so that operation of said drive means drives said carriages in said path.

16. An automatic unscrambler as claimed in claim 1 and further comprising:
air pressure means adjacent said discharge section for directing an air stream toward said discharge section to urge the containers through said openings in said holders.

17. An automatic unscrambler as claimed in claim 1 wherein:
said hopper is elongated and has two substantially straight sides and two curved ends.

18. An automatic unscrambler as claimed in claim 17 and further comprising:
support means below said hopper for supporting and guiding said plurality of carriages in said path.

19. An automatic unscrambler as claimed in claim 18 wherein:
said support means comprises channel means; and
channel engaging means are provided on said carriages for engagement in said channel means.

20. An automatic unscrambler as claimed in claim 19 wherein:
said channel means comprises channel members mounted in spaced relationship and having grooves therein facing each other; and
said channel engaging means comprises a plurality of rollers rotatably mounted on each carriage and in rolling contact in said grooves.

21. An automatic unscrambler as claimed in claim 20 wherein said at least one flexible drive means further comprises:
drive motor means operatively connected to said at least one flexible drive means for driving said flexible drive element.

22. An automatic unscrambler as claimed in claim 21 wherein:
said at least one flexible drive means comprises a chain.

23. An automatic unscrambler as claimed in claim 22 and further comprising:
sprocket means operatively connected to said chain; and wherein
said drive motor means is operatively connected to said sprocket means for driving said sprocket means.

24. An automatic unscrambler as claimed in claim 23 wherein:
said sprocket means comprises a sprocket rotatably mounted adjacent each end of said hopper.

25. An automatic unscrambler as claimed in claim 24 and further comprising:
container directing means for directing containers in said hopper toward said container holders.

26. An automatic unscrambler as claimed in claim 25 wherein:
said hopper bottom comprises an at least partly planar member; and
said container directing means comprises said at least partly planar member being inclined.

27. An automatic unscrambler as claimed in claim 1 and further comprising:
means for removably mounting said container holders on said carriages and means for removably mounting said passageway means on said carriages to facilitate interchangeability thereof with other container holders and passageway means for containers of different sizes and shapes.

28. An automatic unscrambler as claimed in claim 1 wherein:
said at least one flexible drive means comprises a chain.

29. An automatic unscrambler as claimed in claim 1 wherein said at least one flexible drive means comprises:
at least one flexible drive element; and
drive motor means operatively connected to said at least one flexible drive element for driving said flexible drive element.

30. An automatic unscrambler as claimed in claim 1 wherein:
said hopper bottom comprises an at least partly planar member; and
said at least partly planar member is inclined for directing containers in said hopper toward said container holders.

31. An automatic unscrambler for orientating containers such as plastic bottles and lightweight articles comprising:
a hopper for receiving a plurality of randomly positioned containers;
a side wall on said hopper;
a bottom on said hopper having a peripheral portion spaced from said side wall to provide a space through which the containers can pass; a plurality of carriages supported below said hopper for movement in a path adjacent said peripheral portion of said bottom;
at least one flexible drive means connected to each carriage for interconnecting said carriages and driving said carriages in said path;
container holders mounted on said carriages for movement therewith and in position for receiving containers from said peripheral portion of said bottom of said hopper;
openings in said container holders for allowing the containers to pass therethrough;
container support means for supporting the containers in said holders during movement of the holders;
discharge means for discontinuing support of the containers at a predetermined discharge location so that containers in said holders pass through said container holder openings at said discharge location;
passageway means mounted on said carriages below said container holder openings for receiving containers passing through said openings; and
means for orientating containers passing through said openings into a predetermined position.

* * * * *